E. B. A. & R. A. ZWOYER.
MECHANISM FOR PREPARING PULVERULENT MATERIALS FOR MOLDING OR BRIQUETING.
APPLICATION FILED OCT. 26, 1908.
1,152,469.
Patented Sept. 7, 1915.
3 SHEETS—SHEET 1.
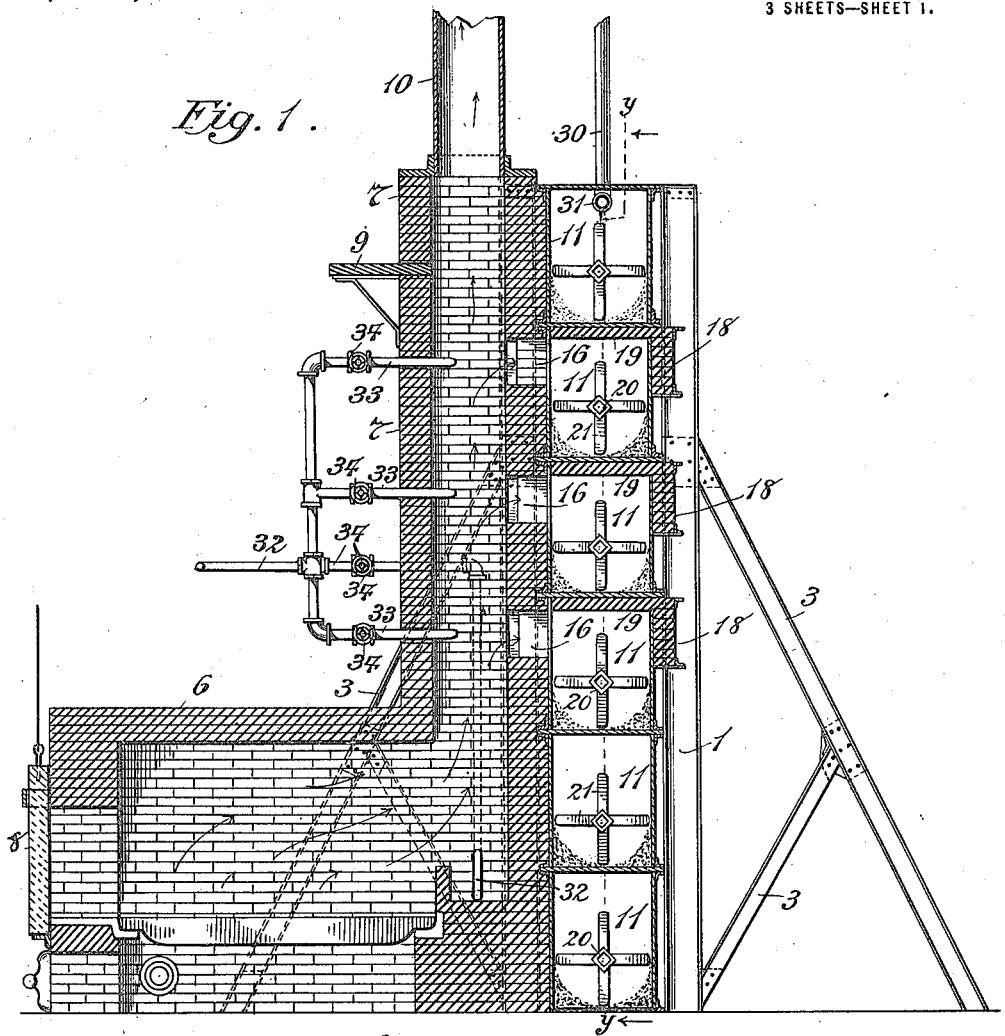
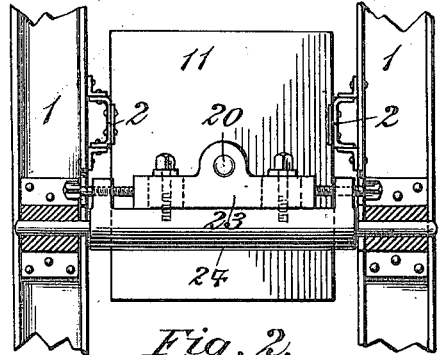
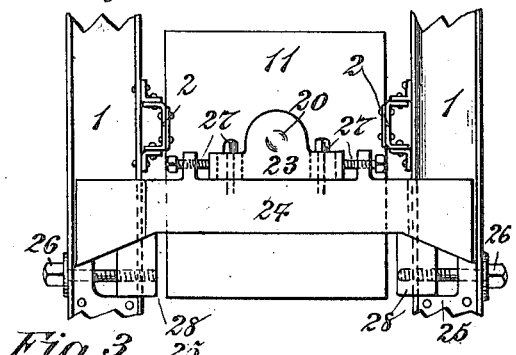

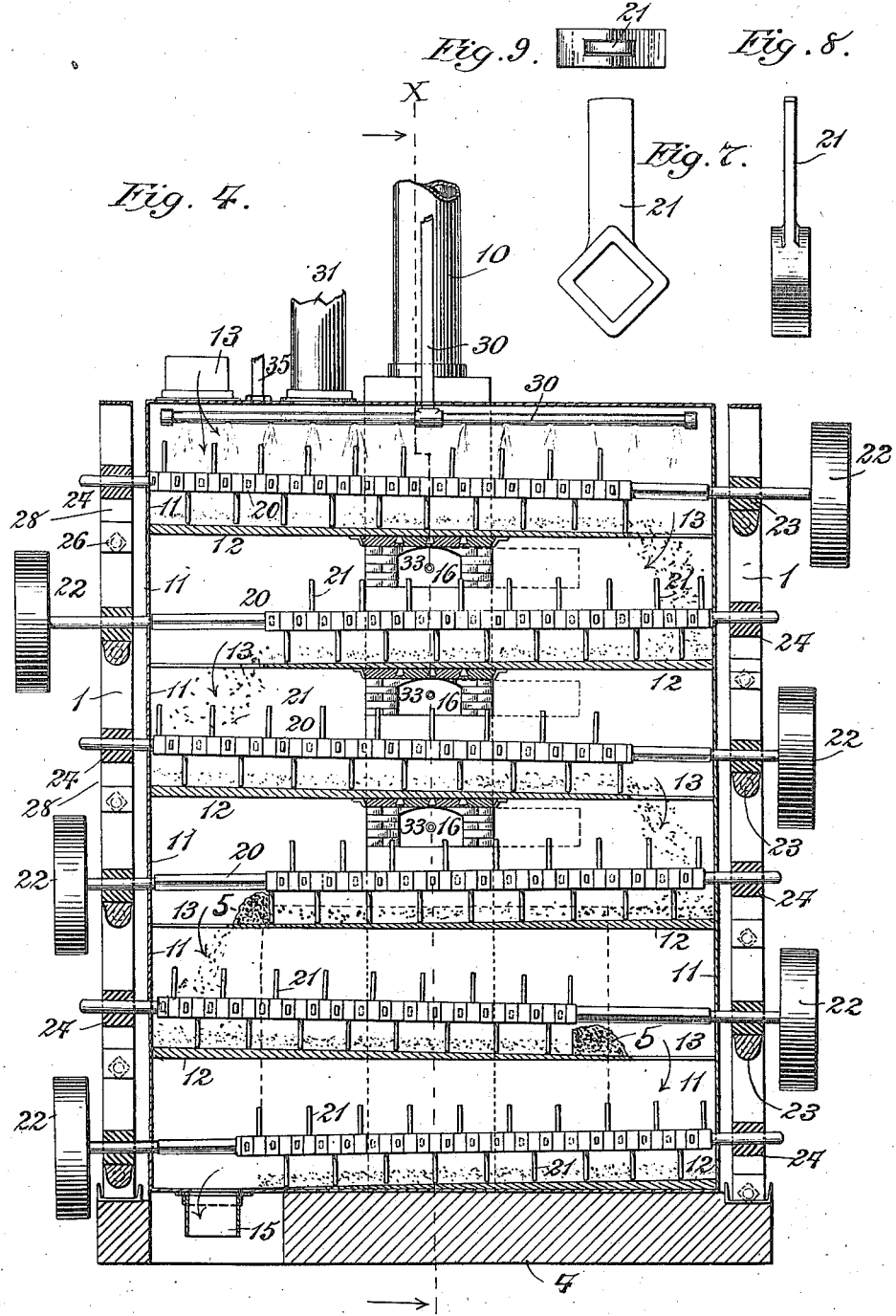

E. B. A. & R. A. ZWOYER.
MECHANISM FOR PREPARING PULVERULENT MATERIALS FOR MOLDING OR BRIQUETING.
APPLICATION FILED OCT. 26, 1908.
1,152,469.
Patented Sept. 7, 1915.
3 SHEETS—SHEET 3.
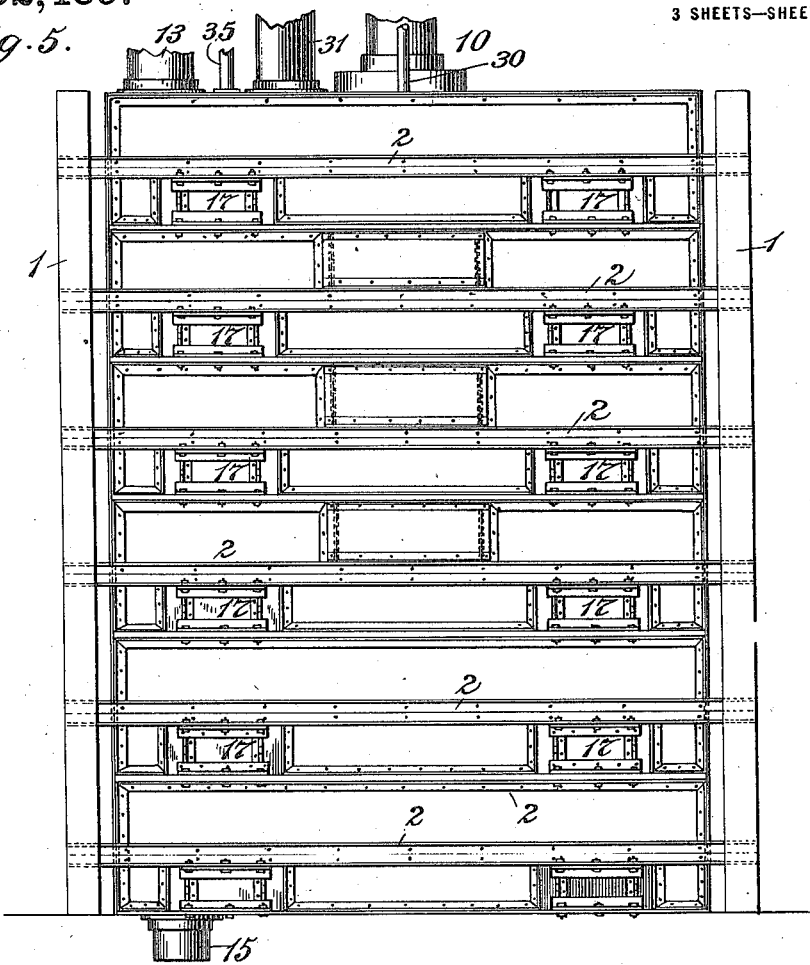
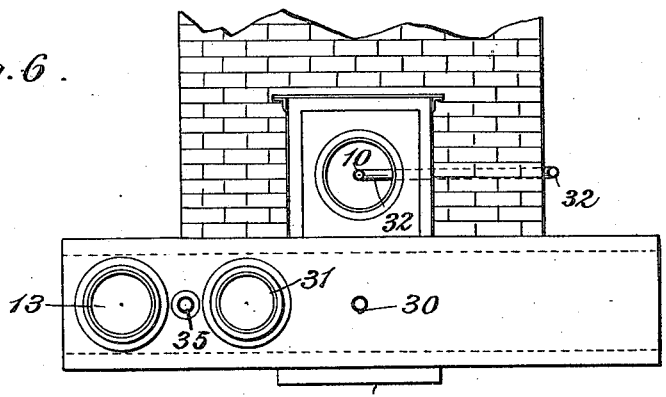

UNITED STATES PATENT OFFICE.

ELLSWORTH B. A. ZWOYER AND ROLLAND A. ZWOYER, OF PERTH AMBOY, NEW JERSEY, ASSIGNORS TO THE ZWOYER FUEL COMPANY, A CORPORATION OF NEW JERSEY.

MECHANISM FOR PREPARING PULVERULENT MATERIALS FOR MOLDING OR BRIQUETTING.

1,152,469.   Specification of Letters Patent.   Patented Sept. 7, 1915.

Application filed October 26, 1908. Serial No. 459,577.

*To all whom it may concern:*

Be it known that we, ELLSWORTH B. A. ZWOYER and ROLLAND A. ZWOYER, citizens of the United States, and residents of Perth Amboy, county of Union, and State of New Jersey, have made a new and useful Invention in Mechanism for Preparing Pulverulent Materials for Molding or Briquetting, of which the following is a specification.

In prior U. S. patents granted to us on the 2nd day of February, 1904, numbered respectively No. 751,133 and 751,134, we have disclosed and claimed novel mechanism and a novel process for preparing pulverulent materials for the purpose of adapting the same for use in connection with the molding or briquetting of pulverulent substances. Said process and mechanism embody the idea of uniting finely powdered or pulverulent materials or substances, such as coal dust, in a suspended condition confined within a mixing chamber with a heated liquid binding agent forced therethrough, and simultaneously mixing and heating the same until it has attained the desired plastic condition for molding it into solid individual masses.

We have ascertained that it is not always possible to obtain the best results with machines like those disclosed in the before-mentioned patents in which there is provided a mechanical rotary stirrer having inclined propelling blades and in which the rotary shaft is horizontally located and permanently secured in stationary journal bearings, and this because of the fact that different types of pulverulent materials and of liquid binding agents necessitate an adjustability of such appliances for varying the speed with which the mixing and forward feeding of the materials may be effected. This adjustability is necessitated by reason of the fact that powdered or pulverulent material varies, according to its condition (as the dryness or dampness), or as to its character (as coal, coke, ore or other materials.) Our present method hereinafter described and the apparatus best known to us for practising such method is designed particularly to effect improved results in these particulars, in that we depend upon the action of gravity which is always a constant force for feeding the materials when combined with a constantly driven mixing device and so adjust the mechanism by shifting the inclination of the feeding shafting and propelling blades as to feed the material while subjected to the intermingling action to the products of combustion for a greater or less time as the conditions or character of the materials require, thus making it possible to practice the method hereinafter described with different characters of materials, and utilize the machine under all climatic conditions, thereby producing a nearly perfect product.

To this end our invention has for its objects, first, the effective mixture of a finely powdered or pulverulent material and a binding agent through the agency of heat, the force of gravity, and an applied source of energy whereby every particle of the pulverulent material and corresponding particles of the binding agent are brought into absolute mechanical contact with each other and successively advanced until the material reaches the desired condition for the best effective use. Second, to provide a machine or apparatus so constructed that the pulverulent material and the binding agent are both introduced therein, and that the two materials as thus introduced into the machine are successively mixed and advanced by a series of mechanically impelled stirrers acting in conjunction with the force of gravity through a series of mixing or stirring chambers, the completed product being ejected finally from the last one of the mixing chambers where it is ready for use in the manufacture of briquettes or solid products.

Our invention will be fully understood by referring to the accompanying drawings, in which, Figure 1 is a sectional view of the entire machine taken through Fig. 4 on the broken line X—X and as seen looking thereat from left to right in the direction of the arrows. Fig. 2 is a detail end elevational view of one of the mixing chambers and the adjustable means of support for the rotary mixer, the pivotal journal bearings therefor being shown in sectional view; and, Fig. 3 is a similar end elevational view of the other end of said mixing chamber illustrating also the means of vertical adjustment of the other end of the rotary mixer. Fig. 4 is a transverse sectional view of the entire machine taken through Fig. 1 on the broken line y—y and as seen looking thereat from right to left in the direction of the arrows. Fig. 5 is a front elevational view as seen looking at Fig. 1 from right to left; and, Fig. 6 is a plan view as seen looking at Fig. 1 from the top toward the bottom of the drawings, part of the furnace, however, being broken away. Fig. 7 is a front elevational view of one of the mixing arms. Fig. 8 is a side elevational view thereof as seen looking at Fig. 7 from left to right, or vice versa; and Fig. 9 is a plan view as seen looking at Fig. 7 from the top toward the bottom of the drawings.

Referring now to the drawings in detail, in all of which like numerals and letters of reference represent like or equivalent parts wherever used, 1, 1, 1, 1 represent four vertically disposed iron I-beams which constitute the uprights of the frame and 2—2, 2—2, represent pairs of horizontally disposed U-irons secured at their opposite ends to said I-beams, there being six pairs of such and securely riveted thereto, as shown in Figs. 2 and 3.

3, 3, 3, 3 represent I-beams secured to the opposite faces of the frame for bracing it laterally.

4 represents the usual brick or other substantial foundation.

6 represents a furnace of usual construction provided with an up-take 7 and a door 8, 9 being a damper for regulating or completely closing the outlet of the up-take upon which is secured the usual smoke-stack or chimney 10.

11, 11 are mixing chambers there being six of these chambers shown, constructed preferably of plate iron and secured on their opposite sides directly to corresponding pairs of the U-irons 2, 2. The bottoms 12 of these chambers are inclined, as clearly illustrated in Fig. 4, the upper one from left to right and so on alternately, for the purpose of more easily facilitating the advancement of the material as it is mixed.

13, 13 represent respectively inlets and outlets to the mixing chambers.

15 represents an outlet pipe or tube of the lower chamber extending through the foundation 4, its location being such that the completed product may be received in any preferred way and conveyed to the briquette making machine in a manner well understood by those skilled in the art.

16, 16, 16 are flues extending from the up-take into three of the mixing chambers 11, said flues being controlled by dampers 16ª, 16ª, 16ª, (shown in broken lines, Fig. 4.)

17, 17, 17, Fig. 5, represent removable doors at the opposite ends of the chambers for permitting of access thereto when it is desired either to examine the interior structure or effect repairs, or clean it out.

18, 18, 18 and 19, 19, 19 are fire brick surfaces opposite the flues 16, 16, 16 for protecting the mixing chambers at those points where the intense heat from the furnace is first admitted into the chambers.

20, 20 are rotary shafts (six in number) one for each chamber, said shafts being each provided with a plurality of sets of radially disposed mixing arms 21, 21. These arms are illustrated in detail in Figs. 7 to 9 inclusive.

22, 22 are pulleys for rotating the shafts 20.

The mixing arms 21, 21 are so arranged in certain of the mixing chambers, notably the fourth and fifth from the top, that the last arm near each outlet 13 will not force the accumulated material off the bottom 12 through said outlet, until there has accumulated a substantial mass thereon, as indicated by the numeral 5, the function of such an arrangement being to enable this last arm to so continuously act by a compounding and churning action upon such an accumulated mass as to effectually eliminate any lumps of the combined materials and thus form a mixture which is putty-like or plastic throughout its entire volume, and this feature also constitutes one of the important elements of our invention, in that it is important particularly in the construction of fuel briquettes from such plastic materials as result from the mixture of a powdered agent, as coal dust, and a liquid binding agent, as molten pitch, that the resultant material shall be uniform as to density and pliability throughout its mass.

Each of the shafts 20 is supported by a journal box 23 provided with screws and slots for adjustably securing it directly to a pivotal support 24, which support is in turn secured directly to the vertically disposed I-beams 1, 1. The supports 24 for the other ends of the shafts 20 (see Fig. 3) are provided on their under surfaces with beveled or inclined ends and adapted to be vertically adjusted by sliding blocks 28, 28 resting upon shoulders 25, 25, in the I-beams 1, the adjustment being effected through the agency of screws 26, 26, and the entire arrangement is such, as will be apparent on inspection of Figs. 2 and 3, that the pitch or angle of each of the shafts 20 may be varied to any desired inclination, thereby making it possible to effect an adjustment such that the speed of mixing may be varied, thus adapting the machine for use with different kinds of material requiring that the same shall be fed forward with more or less speed according as the conditions may necessitate. From a consideration of this portion of the apparatus, it is apparent that the angle of inclination of the several shafts can be independently adjusted, and that this adjustment can be made while the apparatus is running. The speed of feed in the several chambers can, therefore, be adjusted without stopping the operation of the machine, which has great advantages, as the effect of the feed may be observed while the material is passing through the mixers.

30 is a pipe shown as entering the upper portion of the upper mixing chamber where it branches into two parts extending throughout the entire length thereof, and each of the branches is provided on its under side with a series of spraying perforations or openings of sufficient capacity to admit of the free outflow of the liquid binding agent, such as heated or molten pitch, the tank or supply of which is located at such an elevation as will give the desired pressure to force the material downward in the manner indicated in Fig. 4 of the drawings. It will be understood, of course, that a cock may be provided therefor which will regulate this flow in accordance with the necessities of the case.

31 is a smoke-stack similar to 10 but connected directly to the top of the upper mixing chamber 11 and designed to create a draft for the furnace and carry off the products of combustion after the damper 9 is closed in the up-take 7.

32 is a pipe running to a source of air supply or steam under pressure and one branch thereof extends downward and through the side of the furnace, the open end of said pipe at the bottom thereof projecting upwardly, as shown in Figs. 1 and 6, so as to create a forced draft from the furnace proper to start up the apparatus.

33, 33, 33 are additional branches with their free ends located opposite the flues 16, 16, 16.

34, 34, 34 are cocks for regulating the flow of air or steam therethrough.

35 is a pipe located at the top of the upper mixing chamber 11, its function being to convey water or any non-combustion supporting liquid or gas, such as are well known and utilized in the arts for extinguishing fires, the object being to supply the apparatus with a means of extinguishing any fire which may result from the material becoming over-heated during the process of mixing, it being apparent that with such an arrangement should a conflagration occur it is only necessary to admit the water or other agent in a manner which is entirely obvious.

The practice of our novel method of thus mixing pulverulent substances and a heated liquid binding agent with the hereinbefore described machine or apparatus is as follows:—The adjustment of the feed for the admission of the pulverulent substance and of the liquid binding agent to be mixed therewith is effected in the usual manner so as to supply the proper proportions thereof.

A fire is started in the furnace 6 and the products of combustion pass upward through the up-take 7 and out through the smokestack 10. At the same time a forced draft is effected through the agency of the pipe 32 from a source of air supply under pressure, thus forcing the products upward in the manner indicated from the bottom of the furnace. After the fire in the furnace has reached the desired heat the cock 34 in the downwardly extending portion of the pipe 32 is closed and the corresponding cocks 34, 34, 34, in the extensions 33, 33, 33 are opened. At the same time the damper 9 at the upper end of the up-take 7 is closed, thus causing the products of combustion to now pass through the corresponding mixing chambers 11, 11, 11 and finally out through the additional smoke-stack 31. The pulverulent material is now admitted at the top inlet 13 from any source of supply, not shown, and through the agency of gravity, it being allowed to descend in the manner indicated by the arrows in the upper chamber. The shafts 20, 20 of the mixers are continuously rotated by the pulleys 22, 22 and necessary belts connected with a source of mechanical energy, as a steam engine, not shown, but in such manner as to always cause the material to advance in the direction of the arrows. At the same time, the liquid material, in the nature of heated pitch, is permitted to enter the upper chamber through the perforated extensions of the pipe 30. As the pulverulent material and the liquid binding agent are thus admitted they are effectually mixed and caused to advance in the direction of the inclination of the shaft in the upper chamber 11 and dropping by the action of gravity to a more advanced position by being constantly pitched up diagonally and ultimately pass out at the right hand end of that chamber through the outlet 13, when they are again caused to advance to the left in the direction of the arrow and pass thus successively through the four succeeding chambers until finally deposited at the bottom of the machine in a plastic condition of the proper consistency. It will be apparent, therefore, that through the united agency of heat, gravity and a mechanical force applied to the shafts 20 and mixing arms 21, we are enabled to produce successively upon the binding agent and the pulverulent material such an intermixture and with such a heating effect from the furnace as to bring every particle of the pulverulent material into actual mechanical contact with every particle of the binding agent, so that when the materials as thus heated and intermixed finally reach the outlet 15 a mixture is effected which will give the best possible briquetting effects when reduced to a solid briquette form. It will also be apparent that by virtue of the vertical adjustability of the shafts 20 we are enabled to vary the speed with which this mixture may be effected in the entire apparatus, or any desired portion thereof. It will also be seen that the adjustability of the force-blast makes it possible to vary the application of the heat, so that after the machine has been once adjusted to adapt it to give the best results for the peculiarities of the combinations to be mixed, it may thus be run continuously. Such an adjustability also makes it possible to adapt such a machine to materials of different peculiarities and condition which was not possible with the structural apparatus disclosed in our earlier patents. It will also be apparent that by locating one of a series of mixing chambers above another we have been enabled to provide a machine which makes it possible to afford the most thorough mixture of a pulverulent material and a binding agent in the shortest possible time and of utilizing in the manner we have hereinbefore described the force of gravity in effecting such mixtures to the best possible advantage.

We do not limit our invention to the especial structural apparatus hereinbefore described for practising the methods hereinafter claimed, as we believe it is broadly new with us to effect the method of a thorough intermixture of pulverulent material and a liquid binding agent through the agency of the force of gravity and a mechanically applied force, and also through the agency of heat, gravity, and a mechanically applied force, and our claims as to the mechanism are to be construed as of the most generic nature for applying or practising the methods claimed.

The method herein described is not claimed herein, but will form the subject matter of an additional application for patent to be filed subsequently.

Having thus described our invention what we claim and desire to secure by Letters Patent of the United States is—

1. A machine for mixing a pulverulent substance and a binding agent, embracing a mixing chamber; an inlet for the pulverulent substance and binder located at one end thereof; a mixer or stirrer located in the chamber and provided with a plurality of radially disposed arms adapted to stir and mix the two substances; an outlet located at the distant end from the inlet, the last arm of the mixer or stirrer being located at such a distance from the outlet as will permit the material to accumulate in a mass and be acted upon successively for a definite time, before the material thus accumulated shall drop by gravity through the outlet whereby any lumps or imperfectly mixed masses shall be subjected to the action of such last arm for such time as will effect the completion of the mixture, substantially as described.

2. An apparatus for preparing pulverulent materials for molding or briquetting, which comprises a plurality of mixing chambers, arranged one over another, each having a shaft and mixing blades thereon, whereby the material will pass through the chambers in succession, and a single furnace, and connections between the said furnace and a plurality of said chambers for directly admitting hot gases of combustion from the furnace to a plurality of the chambers.

3. An apparatus for preparing pulverulent materials for molding or briquetting, which comprises a plurality of mixing chambers, arranged one over another, each having a shaft and mixing blades thereon, whereby the material will pass through the chambers in succession, and a single furnace, an uptake passing adjacent to the chambers from the furnace, and separate flues from the uptake to a plurality of the chambers.

4. An apparatus for preparing pulverulent materials for molding or briquetting, which comprises a plurality of mixing chambers, arranged one over another, each having a shaft and mixing blades thereon, whereby the material will pass through the chambers in succession, a single furnace, an uptake passing adjacent to the chambers from the furnace, separate flues from the uptake to a plurality of the chambers, and means for varying the quantity of hot gases passing through the separate flues.

5. An apparatus for preparing pulverulent materials for molding or briquetting which comprises a plurality of mixing chambers, arranged one over another, each having a shaft and mixing blades thereon, whereby the material will pass through the chambers in succession, a single furnace, an uptake passing adjacent to the chambers from the furnace, separate flues for the uptake to a plurality of the chambers, and forced draft pipes directing into the flues for varying the quantity of hot gases entering the separate flues.

6. An apparatus for preparing pulverulent materials for molding or briquetting, which comprises a plurality of mixing chambers, a support for the chambers, supporting them in fixed position, each chamber having a shaft and mixing blades thereon, whereby the material will pass through the chambers in succession, means for varying the angle of the shafts while the apparatus is running, a single furnace, and flue connections between said furnace and certain of said chambers.

7. An apparatus for preparing pulverulent materials for molding or briquetting, which comprises a plurality of mixing chambers, a support for the chambers, supporting them in fixed position, each chamber having a shaft and mixing blades thereon, whereby the material will pass through the chambers in succession, and means for varying the angle of the shafts, such means being separate for each chamber, and independent of the others, a single furnace, and flue connections between said furnace and certain of said chambers.

8. An apparatus for preparing pulverulent materials for molding or briquetting, which comprises a plurality of mixing chambers, a support for the chambers, supporting them in fixed position, each chamber having a shaft and mixing blades thereon, whereby the material will pass through the chambers in succession, means for varying the angle of the shafts, such means being separate for each chamber, and independent of the others, and operatable outside of the chambers while the apparatus is running, a single furnace, and flue connections between said furnace and certain of said chambers.

In testimony whereof we have hereunto signed our names to this specification in the presence of two subscribing witnesses.

ELLSWORTH B. A. ZWOYER.
ROLLAND A. ZWOYER.

Witnesses:
C. J. KINTNER,
M. F. KEATING.